United States Patent [19]

Sizer et al.

[11] Patent Number: 5,739,437
[45] Date of Patent: Apr. 14, 1998

[54] PROCESS AND ARTICLE FOR DETERMINING THE RESIDENCE TIME OF A FOOD PARTICLE TRX-371

[75] Inventors: Charles E. Sizer, Hawthorn Woods; Sevugan Palaniappan, Grayslake, both of Ill.

[73] Assignee: Tetra Laval Holdings & Finance SA, Pully, Switzerland

[21] Appl. No.: 769,811

[22] Filed: Dec. 19, 1996

Related U.S. Application Data

[63] Continuation-in-part of Ser. No. 667,124, Jun. 20, 1996.
[51] Int. Cl.[6] .................................................. G01F 1/708
[52] U.S. Cl. ............................................. 73/861.05
[58] Field of Search ........................ 73/865.8, 865.7, 73/861.05; 99/342, 352, 355, 470; 422/32; 426/520, 521, 531

[56] References Cited

U.S. PATENT DOCUMENTS

| | | | |
|---|---|---|---|
| 4,829,812 | 5/1989 | Parks et al. | 73/12.04 |
| 5,261,282 | 11/1993 | Grabowski et al. | 73/861.05 |

*Primary Examiner*—Robert Raevis
*Attorney, Agent, or Firm*—Michael A. Catania

[57] ABSTRACT

The article of the present invention is an analog of a particular object which has substantially the same size, shape and rotational inertia of the object while having the density of the medium of which the object is within. The analog encompasses a signal generator which may be used to analyze various properties of the object. More specifically, the article of the present invention is an analog of a food particulate undergoing aseptic processing wherein the food particulate is a constituent of a heterogeneous food such as soup or yogurt with fruit. The analog has substantially the same size, shape and rotational inertia of the actual food particulate while the article has the density of a fluid. The analog encompasses a signal generator which may be used to measure the residence time of the analog in a holding tube of an aseptic processing machine. The article also has the thermal conductivity of the food particulate. The process of the present invention determines the residence time of a food particulate undergoing aseptic processing wherein the food particulate is a constituent of a heterogeneous food such as soup or yogurt with fruit. The process uses the article of the present invention to generate a signal which is indicative of the residence time of the analog. The signal generator may be a magnet, and more particularly a samarium cobalt permanent magnet.

15 Claims, 5 Drawing Sheets

PROCESS AND ARTICLE FOR DETERMINING THE RESIDENCE TIME OF A FOOD PARTICLE TRX-371

CROSS-REFERENCE TO RELATED APPLICATIONS

This is a continuation-in-part of application Ser. No. 08/667,124, filed on Jun. 20, 1996.

STATEMENT REGARDING FEDERALLY SPONSERED RESEARCH OR DEVELOPMENT

Not Applicable

BACKGROUND OF THE INVENTION

1. Field of the Invention

The present invention relates to a process and article for analyzing a particular object through use of an analog of the object. Specifically, the present invention relates to a process and article for determining the residence time of a food particle undergoing aseptic processing.

2. Description of the Related Art

Many processes which have been invented require reliable data on a particular aspect of the process before the process receives validation of its efficacy from either a regulatory body or industry. Often, methods to obtain the reliable data are beyond the scope of the current art, thereby rendering beneficial processes commercially unusable. For example, there is currently no method to provide reliable data for the residence time of an object undergoing analysis in the situation where the object is a constituent of a heterogeneous phase throughput system. This has rendered many beneficial processes which rely on such data unusable. An example oil such a process is an aseptic process for the production of a low acid shelf-stable food.

Before distribution to consumers, low acid (pH over 4.6) shelf-stable food products must be sterilized through heat treatment or other processes in order to achieve microbiological inactivation in the food product. An example of the sterilization of a heterogeneous food (foods having different phase constituents) is the heat treatment process for canned soups having food (vegetable and/or meat) particulates. The soup is dispensed into the cans and hermetically sealed therein. The cans are then placed upon a rotator and heated to a temperature of approximately 121° C. while rotating. The heat process is necessary to achieve adequate microbiological inactivation to produce a shelf-stable product. The rotation of the cans expedites the heating of the liquid medium and the exterior of the solid particulates. However, the heating of the center of the food particulates is a much slower process because it can only take place through conduction heating. The heating time for the center of the food particulate increases as the aspect ratio (width to thickness) for the food particulate decreases. Thus, it will take longer to heat the center of a potato cube than it will to heat the center of a green bean (which has a quasi-cylindrical shape) because the surface area to volume of the green bean is greater than the surface area to volume of the potato cube.

An alternative microbiological inactivation process for food particulates in a liquid medium is aseptic processing. In aseptic processing, the heterogeneous food is conveyed through a number of first heat exchange sections for heating, to a holding tube for a set residence time to sterilize the food particulates, then to a number of second heat exchange sections for cooling before packaging. The thermal process design for such a product requires the use of a mathematical model which requires the residence time distribution data to optimize the product quality and microbial safety. This process is much faster than the latter, however, it has been difficult to establish the residence time for the food particulates because present tracking methods of the food particulates are unreliable. In order to insure that a safe lethality level for microorganisms is obtained for the center of food particulates, the residence time for food particulates in the holding tube and at the heat exchangers at a predetermined temperature must be established with reliable data. Although microbiological validation may be conducted on a batch of the heterogeneous food at the end of the validation process, without reliable data on the residence time of food particulates in the holding tube a safe lethality level will remain unknown or unsure at best. Therefore, governmental and industry regulatory bodies will not accept the safety of such a process which results in the inability to use this process to sterilize heterogeneous foods for sale to the public.

The food industry has invested a tremendous amount of time and money in analyzing this process and trying to provide reliable data for the residence time for food particulates undergoing this process. From the analysis of this process, much has been learned and accepted as fact. First, there is a definite difference between the residence time distribution of the food particulates and the liquid medium, with the particulates, on average, traveling faster than the mean velocity of the heterogeneous food. The size and concentration of the particulates affect the residence time as do the flow rate and viscosity of the heterogeneous food. The residence time must be measured for the fastest food particulates to ensure microbiological inactivation. With this knowledge, some in the food industry have attempted to measure the residence time of the food particulates or otherwise verify the efficacy of this process.

One such method uses magnetic resonance imaging to create temperature maps of food particulates to verify that the center is properly heated. Other methods place tracers in the actual food particulates and attempt to calculate the residence time by tracking the tracers. However, the size, shape, density and rotational inertia of the food particulate are altered by placing tracers in the actual food particulate. This results in unreliable data because that which is being tracked flows differently, and thus has a different residence time from the actual food particulate. Also, breakage of the particulate may occur resulting in the tracer slipping out of the particulate which would also effect the data.

Therefore, industry has yet to provide a reliable method for verifying the residence time of an object undergoing analysis in a situation where the object is a constituent of a heterogeneous phase system. The absence of such a method has prevented the use of various processes which need reliable data on the residence time of the object to demonstrate their efficacy.

BRIEF SUMMARY OF THE INVENTION

The present invention meets the unfulfilled needs of the industry by providing a process and article for determining the residence time of an object undergoing analysis wherein the object is a constituent of a heterogeneous phase system. The present invention fulfills this need in a manner which should demonstrate the efficacy of many processes.

One embodiment of the present invention is an article for determining the residence time of a food particle undergoing aseptic processing wherein the food particle is a constituent of a heterogeneous fluid. The heterogeneous fluid is composed of at least the food particle and a fluid. The article comprises a signal generator and an analog of the food particle having substantially the shape, size and rotational inertia of the food particle. The analog encompasses the signal generator. The article may have an approximate density range between the density of the food particle and the density of the fluid. The food particle may be selected from the group consisting of fruit, meat, fish, pasta, vegetable and bread. The signal generator may be a magnet and more specifically a rare earth magnet such as a samarium cobalt magnet. The analog may be composed of a mixture of an epoxy and microglass bubbles. The analog may also be composed of a chicken alginate composition and microglass bubbles. The article may also be inoculated with bacterial spores when composed of a chicken alginate composition and microglass bubbles. The signal generator may be placed at the geometric center of the article. In a very specific example, the food particle is a potato. Further, the signal generator may generate a signal by passing through a sensor. In another specific example, the heterogeneous food is a soup. In yet another specific example, the heterogeneous food is a yogurt with fruit. The article may have the thermal conductivity of the food particle.

Another embodiment of the present invention is a process for determining the residence time of a food particle undergoing aseptic processing wherein the food particle is a constituent of a heterogeneous fluid. The process comprises the steps of: (1) substituting an article for the food particle undergoing aseptic processing; and (2) receiving a signal generated from the article which is indicative of the residence time of the article during aseptic processing. The process may further comprise dividing the step of receiving a signal into: (1) receiving a first signal generated from the article at a first point during the aseptic processing; and (2) receiving a second signal from the article at a second point during the aseptic processing. The process may still further comprise the step of calculating the residence time of the article by measuring the time between the first signal and the second signal. The process may still further comprise the step of receiving a multiple of signals generated by the article throughout the aseptic processing of the food particle. The signal generator of this embodiment may also be a magnet and the first, second and multiple of signals may be generated by the article passing through electrically conductive coils therein inducing an electromotive force in the coils. These signals may be seen as changes in the voltage of the coil. In a very specific example, the first point and the second point are the points of ingress and egress to a holding tube of an aseptic processing machine. In another specific example, the heterogeneous fluid may be a heterogeneous food such as soup or pudding. The process may still further comprise the step of transmitting the signals to a data acquisition system for computational processing.

Another embodiment of the present invention is an article for determining the residence time of an object undergoing temporal analysis wherein the object is a constituent of a heterogeneous phase system. In this embodiment, the article comprises a signal generator and an analog of the object having substantially the shape, size and rotational inertia of the object. The article having an approximate density range between the density of the object and the carrier medium. The analog encompasses the signal generator. As with the previously mentioned embodiments, the object may be a food particulate which is a constituent of a heterogeneous fluid undergoing aseptic processing. However, the scope of the present invention is not limited to just food particulates. Whether food particulates or other objects, the analog may be composed of a mixture of an epoxy and microglass bubbles, and may even have a magnet as the signal generator. The article may have the thermal conductivity of the object.

Still another embodiment of the present invention is a process for determining the residence time of an object undergoing analysis wherein the object is a constituent of a heterogeneous phase system. The process comprises the steps of: (1) substituting an article for the object undergoing analysis; and (2) receiving a signal generated from the article which is indicative of the residence time for the article during analysis. The article comprises a signal generator and an analog of the object having substantially the shape, size and rotational inertia of the object. The analog encompasses the signal generator. The article having an approximate density range between the density of the object and the carrier medium.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWING

Several features of the present invention are further described in connection with the accompanying drawings in which:

There is illustrated in FIG. 1 a side view of one embodiment of an article of the present invention.

There is illustrated in FIG. 2 a side cross-section view of the article of FIG. 1.

There is illustrated in FIG. 3 a front cross-section view of an embodiment of an article of the present invention.

There is illustrated in FIG. 4 a flow diagram of an aseptic processing system.

There is illustrated in FIG. 5 a graph of the residence time percentages of potato, chicken alginate analogs and synthetic analogs.

DETAILED DESCRIPTION OF THE INVENTION

The present invention is particularly applicable for determining the residence time of a food particulate during aseptic processing of a heterogeneous food. However, those skilled in the art will recognize that the present invention may have application to a multitude of disciplines. Therefore, the present invention will be described in the following paragraphs through reference to the accompanying drawings with the caveat that such description does not limit the application of the present invention.

Regulatory bodies and the industry have established that the lethality of aseptic processing may be proved by demonstrating that the fastest food particulates have a predetermined residence time at a predetermined temperature in the holding tube and heat exchange sections of an aseptic processing machine. An analog of a food particulate which generates a signal upon entering and exiting a holding tube may be used to determine the residence time of a food particulate in fulfillment of the mathematical model for this process. The analog should also be able to simulate the fastest particle through the system in order to ensure that the fastest particle has a sufficient residence time. However, the analog of the food particulate should have substantially the same shape, size and rotational inertia of the actual food particulate while having the density of the fluid or medium through which the food particulate travels or is carried while undergoing aseptic processing. Regulatory bodies and the industry have also established that the residence time of 299 analogs, using distribution free statistics should be calculated in a single run of an aseptic processing system to verify that the fastest particulate has the minimum residence time. It has also been determined that the fastest particle would travel through the center of the medium thereby avoiding collisions with the inner walls of the system. Thus, the density of the analog should substantially match the density of the fluid. If the density is too high, the analog will tend to fall to the bottom of the system. If the density is too low, the analog will tend to rise to the top of the system.

Figure 1:
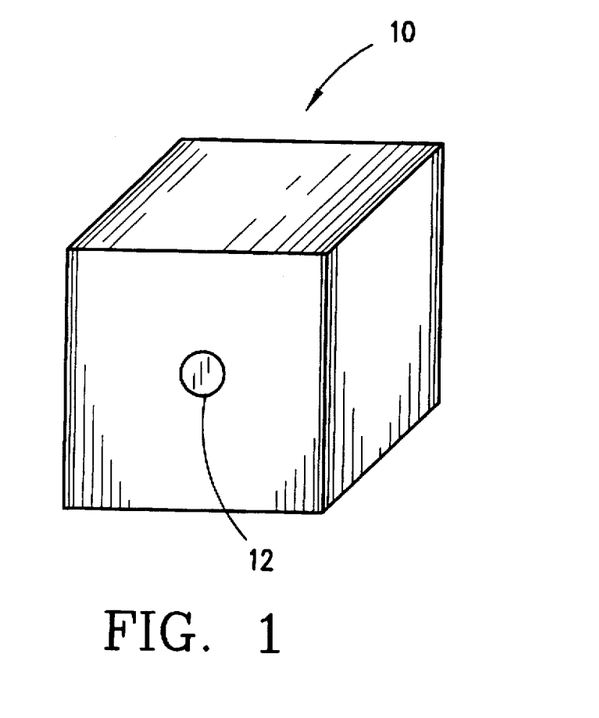

There is illustrated in FIG. 1 a side view of one embodiment of an article of the present invention. As shown in FIG. 1, there is an article in the shape of a diced potato generally designated 10. The article 10 is molded to the shape of a potato from an epoxy and microglass bubbles mixture. An alternative composition for the article 10 would be a chicken alginate composition and microglass bubbles as described in Table two. A suitable epoxy is Power Poxy (R) epoxy adhesives from Power Poxy Adhesives, Inc. of New Berlin, Wis. Suitable microglass bubbles are Resin Accessories Micro Glass Bubbles from Fibre-Glass Evercoat Company, Inc. of Cincinnati, Ohio. The epoxy and microglass bubbles mixture may be molded to resemble a multitude of food particulates including potatoes, carrots, beans, pieces of beef, pieces of chicken, pasta, and the like. The article 10 may also be molded to resemble a multitude of non-food objects. The density of the article 10 may be adjusted to substantially match the density of the fluid or medium by increasing or decreasing the ratio of epoxy to microglass bubbles in the mixture. To simulate the density of the fluid in a potato soup, the article 10 is molded from a mixture of approximately 52.5 grams of epoxy to 1 gram of microglass bubbles. A preferred diced potato would be a cube having a side length of 12.7 mm.

The article 10 has a bore 12 which has been drilled into the article 10 to provide access to the geometric center of the article 10. A magnet 14, not shown, is delivered through the bore 12 and placed at the geometric center of the article 10. The magnet 14 is placed at the geometric center of the article 10 to minimize the rotational inertia of the article 10. Once the magnet 14 is in place, the bore 12 is filled with a mixture of epoxy and microglass bubbles similar to the mixture of the article 10.

Figure 2:
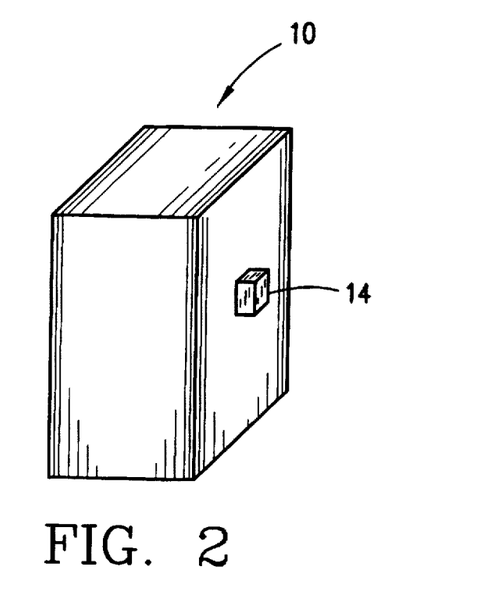

There is illustrated in FIG. 2 a side cross-sectional view of the article of FIG. 1. As shown in FIG. 2, the article 10 is in the shape of a diced potato. The geometric center of the article 10 is exposed thereby revealing the magnet 14. As mentioned previously, the magnet 14 is placed in the geometric center of the article 10 by way of the bore 12. The magnet 14 must be sufficiently powerful to generate an emf in a coil which surrounds the exterior of a holding tube of an aseptic processing system. However, the attraction of the magnet 14 to the components of a processing system, which are usually composed of stainless steel, should be de minimus. The attraction is shielded by the article 10 which encompasses the magnet 14. Other parameters of the magnet 14 are that the magnet 14 be sufficiently small in size, weight and shape to accommodate the substitution of a plethora of food particulates. Although a variety of permanent magnets would suffice for the present invention, a preferred magnet is a rare earth magnet, and in particular a samarium cobalt alloy having the formula $Sm_3Co_5$. A source of such magnets is Arnold Engineering of Ogallala, Nebr. A preferred samarium cobalt permanent magnet would be 2 $mm^3$, having a density of 8.35 $g/cm^3$, and a residual induction of 8,800 gauss. The magnet 14 should be placed in substantially the geometric center so as to minimize its influence, if any, on the rotation of the article 10 as the article 10 travels in a fluid medium through an aseptic processing machine. As mentioned above, the attraction of the magnet to the components of a processing system should be de minimus or the flow the article 10 will be altered from the true nature of the food particulate or other object for which the article 10 is a surrogate. For comparison, if the magnet 14 was placed in the upper quarter of the article 10, then the magnet 14 would have a substantial influence on the rotation of the article 10 as it travels in a fluid medium through an aseptic processing machine. Such a rotation would not adhere to the true rotation of the food particulate for which the article 10 is an analog.

Figure 3:
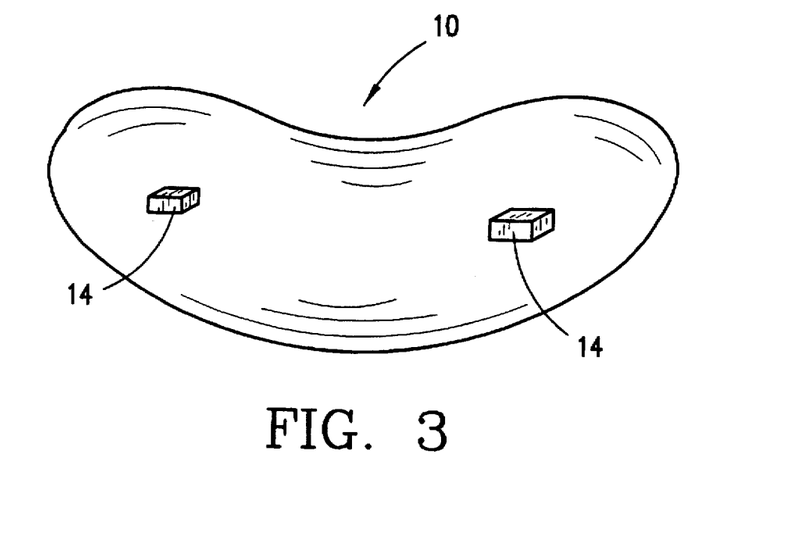

There is illustrated in FIG. 3 a front cross-sectional view of an embodiment of an article of the present invention. As shown in FIG. 3, an article 10 is in the shape of a kidney bean. Similar to FIG. 2, the article 10 is molded to the shape of a kidney bean from an epoxy and microglass bubbles mixture. The center of the article 10 is exposed thereby revealing a pair of magnets 14. Unlike FIG. 2, where the article 10 is in the shape of a potato, the elliptical shape of the kidney requires placement of a pair of magnets. The magnets 14 are placed at different locations in order to minimize any unbalancing due to the rotational inertia of the magnets. The placements of the pair of magnets may be at the gravitational focus of the ellipsoid. In this manner, the true rotational inertia of the actual food particulate or object is maintained by the article 10.

Although thorough descriptions of the article 10 in the shape of a potato and a bean have been provided, it is readily apparent that the article 10 may take the form of a multitude of food particulates or other objects. However, the article 10 must have substantially the same shape, size and rotational inertia of the desired food particulate or other objects while having the density of the fluid or medium if the article 10 is to serve as a proper surrogate. The article 10 may simulate the density of a desired fluid by modifying the epoxy and microglass bubbles mixture accordingly. For example, if the article 10 is to simulate a potato in a soup, the potato having a density of 1.05 $g/cm^3$ and the soup having a density of 1.02 $g/cm^3$, then the article 10 should have a density that is equal to or more than the soup and less than the potato. A preferred density range for the article 10 is between 1.01 and 1.05 $g/cm^3$ for a potato. However, if the food particulate or object has a lower density than the soup or carrier medium then the article 10 should have a density that is equal to or less than the soup or carrier medium and more than the food particulate or object. Such density adjustments ensure that the article 10 is the fastest particle through the system which provides invaluable data on the residence time of a food particle or object undergoing analysis.

Another important factor in measuring the residence time of a food particle undergoing analysis is the thermal conductivity of food particle. The article 10 which substitutes for the food particle should have a substantially similar thermal conductivity to ensure that the heating of the interior of the article 10 is similar to the real food particle undergoing aseptic processing. By substantially matching the thermal conductivity, the article 10 will be subjected to the temperature forces which might affect the actual food particle. The thermal conductivity of the food particle or object should be measured using accepted methodologies in order to produce an article 10 that simulates the thermal conductivity of the food particle or object. Such an accepted methodology is disclosed in Murakami, Thermal Processing Affects Properties of Commercial Shrimp and Scallops, *J. Food Sci.*, 59(2) 1994, which is hereby incorporated by reference. Thus, the thermal conductivity of the article may match that of the food particle or object.

As is apparent from the above-mentioned parameters for the article 10, the magnet 14 must be able to integrate with the article 10 without substantially deterring from any of these parameters. However, the magnet 14 must be able to generate a sufficiently strong signal for calculation of the residence time of the article 10 as it undergoes aseptic processing or any other processing which might dissipate its magnetic powers.

According to Faraday's law of electromotive induction, if a magnet is moved toward or away from an electrically conductive coil (such as copper), an electric current is induced in the coil (Halliday and Resnick, 1970). This current generates an electromotive force (emf). If a magnet moves relative to a coil (made of several turns) a current will be set up in every turn and the emfs are additive. Thus, the electrical effect is a function of the number of turns of the wire in the coil. In addition, the electrical effect is also a function of the magnitude of the relative motion between the magnet and the coil, as well as the orientation of the magnets as they pass through the coil and, obviously, the magnetic strength of the magnet being used. Therefore, the magnet 14 must have sufficient induction to generate an emf in a coil wound around the exterior of the holding tube or other sections of an aseptic processing machine.

Figure 4:
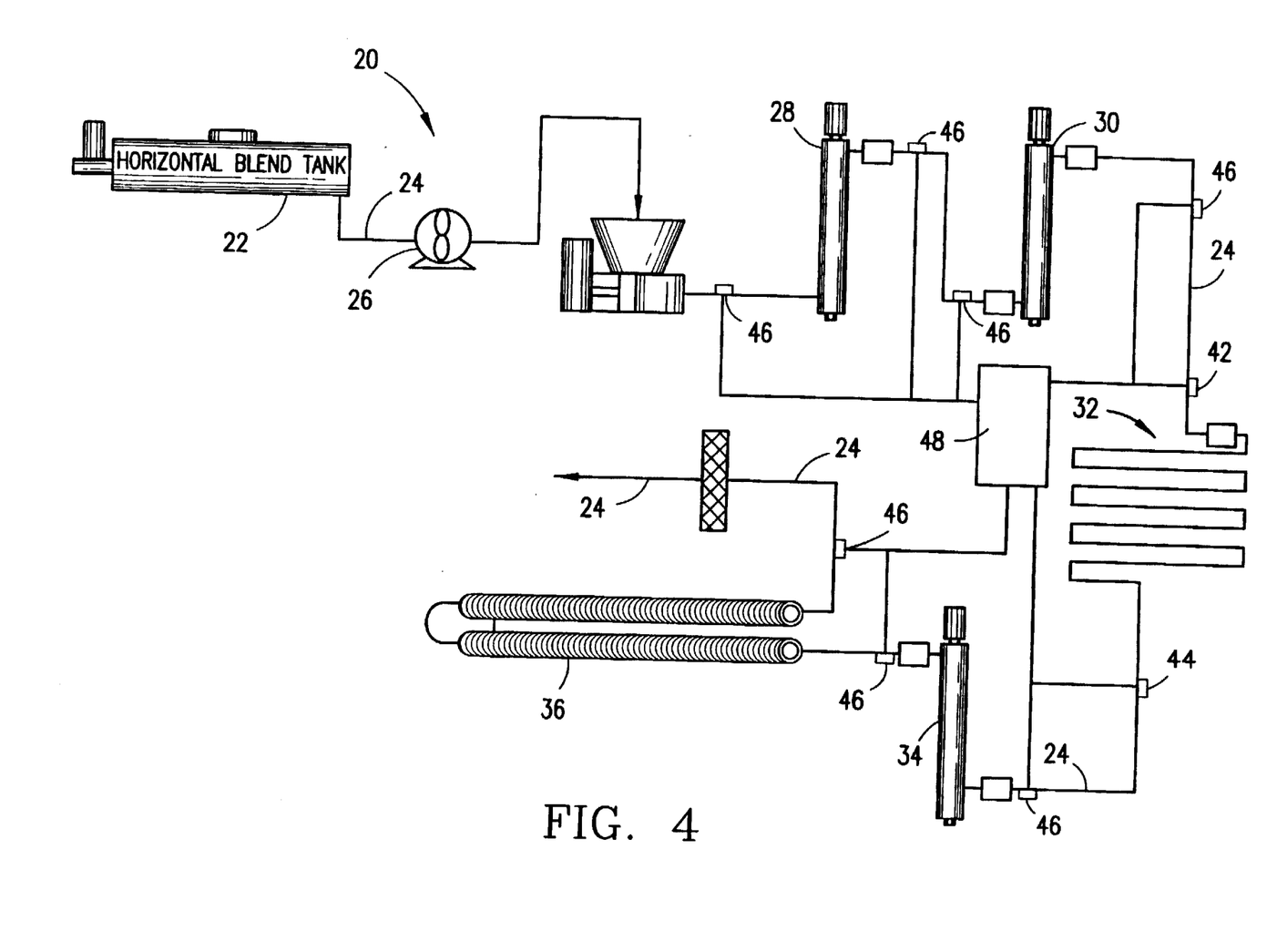

There is illustrated in FIG. 4 a flow diagram of an aseptic processing system. Such a system is well known in the pertinent art and will only be generally described here to demonstrate the modification of such a system in order to practice the present invention. As shown in FIG. 4, the aseptic processing system is generally designated 20. The aseptic processing system 20 generally consists of a blending tank 22, piping 24, a forward pump 26, a first heater 28, a second heater 30, a plurality of holding tubes 32, a first cooler 34, a second cooler 36 and a filler 40. A heterogeneous food product, such as a soup or a yogurt with fruit, is placed in the blending tank 20 then pumped by the first pump 26 through the piping 24 to the first heater 28. At the first heater 28, the food product is heated to a liquid temperature of approximately 99° C. The food product then proceeds to the second heater 30 where it is heated to a liquid temperature of approximately 140° C. From the second heater 30, the food product proceeds through the piping 24 to the plurality of holding tubes 32. To achieve substantial lethality, the food product should have a minimum residence time in the holding tubes of approximately 180 seconds. The liquid temperature exiting the plurality of holding tubes 32 should be approximately 135° C. and the particulate temperature should be approximately 130° C. From the plurality of holding tubes 32 the food product proceeds through the piping 24 to the first cooler 34 where it is cooled to a liquid temperature of approximately 83° C. The food product then proceeds to the second cooler 36. At the second cooler 36, the food product is cooled to a liquid temperature of approximately 21° C. From the second cooler 36, the food product proceeds through the piping 24 to a filler 40 for packaging and distribution.

The present invention is designed primarily to measure the holding tube and system components' residence times of a food particulate in a fluid medium. To accomplish this, the aseptic processing system 20 is modified by the addition of sensors located throughout the system 20 but primarily at the entrance and exit of the plurality of holding tubes 32. The sensors may take various forms, however, the sensors must be able to detect an analog of an object such as a food particulate as it passes by the sensors. A preferred sensor for an analog of a food particulate having a magnet as a signal generator would be coils of electrically conductive wire such as varnished 24 gauge copper wire with approximately 600 to 800 turns. A first sensor 42 and a second sensor 44 are located at the entrance and exit of the plurality of the holding tubes 32 respectively. The residence time of an analog in the plurality of holding tubes 32 may be measured as the analog passes by sensor 42 and sensor 44. Although measuring the residence time is of greatest importance, other sensors 46 may be located at the entrance and exit of the first heater 28, the second heater 30, the first cooler 34 and the second cooler 36 to measure the heating and cooling times of the analog at these stages of the aseptic processing system 20. In the case of an analog of a food particulate, it is important to measure the heating and cooling times for purposes of lethality. The sensors 42, 44 and 46 are connected to a data acquisition system 48, not shown. As the analog passes through the sensors 42, 44 and 46, the signals are transmitted to the data acquisition system 48 for further processing. In an alternative example, the sensor 42 may encompass the entire exterior of the holding tubes providing a continuous signal to the data acquisition system 48. Although coils of wire have been described as the sensors, those skilled in the pertinent art will recognize that many other sensor means are applicable to the present invention.

In practicing one aspect of the present invention, the previously mentioned article 10, having a magnet 14 located in its geometric center, is placed into the aseptic processing system at a particle charging station 50. The article 10 generates a signal as it passes through sensor 46 prior to entering the first heater 28. If the sensor 46 is a coil of copper wire, a voltage drop will occur as the article 10 passes through it. The detection of this voltage drop will be sent to the data acquisition system 48 for further processing. As the article 10 passes through each of the sensors 42, 44 and 46 at the entrances and exits of plurality of heating tubes, heaters and coolers, a will be generated which is sent to the date acquisition system 48. As food particulates pass through the sensors 42, 44 and 46, they will generate a small voltage drop which is easily distinguishable from the article 10 passing through the sensors 42, 44 and 46.

Although a description of the residence time of an analog of a food particulate has been described, it is readily apparent that the present invention embodies the temporal analysis of an analog of a multitude of objects moving in a medium of a different phase from the object through a system. As is also readily apparent, various signal generators and sensors may be employed in practicing the present invention for measuring the residence time of food particulates and the analysis of other objects.

The present invention will be described in the following examples which will further demonstrated the efficacy of the novel process and article, however, the scope of the present invention is not to be limited by these examples.

EXAMPLE ONE

A data acquisition system and system tracers were worked on in the lab prior to the actual run. The articles were simulated half inch cubed potato particles having densities of approximately 1.02 g with samarium cobalt magnets placed directly in the center of the particle. The detection system consisted of two opposite wound coils using 24 gauge wire. The coils were wound around two inch diameter pipe for a width of two inches with inch spacing between the coils. The pipes would be placed at the inlet and outlet of each component of the aseptic processing system.

For this test the system consisted of a total of three sets of coils, with each individual pair of coils being connected in series. Each set of coils had its own channel on the data acquisition board. By placing the coils in series it allowed for the entry and exit of each magnetic particle to be recorded on the same channel. These sets of coils were placed at the entry and exit of the pre-heater, final-heater, and the hold tube in order to determine the time that every particle spent in each. The ten simulated particles that were injected into the system were numbered and injected at three minute intervals. Each particle was then recovered at the end of the system. The magnetic particles passed through the system generated bipolar millivolt signals. This millivolt signal was amplified and logged using Keithly Metrabyte hardware and Labtech 9.0 software. The time that each particle spent in passing through the pre-heater, final heater, and hold tube were calculated from the time difference when the signals were recorded for the outlet and inlet of any system component.

A combination of Thermtex and Thermflo starches in amounts of 2% and 4% were used for the particulate carrier fluid. The starches were mixed in a small amount of cold water in order to dissolve the starch, this high concentration starch solution was then added to the rest of the water. The total starch solution was 805 kilograms and heated up to 68° C. in order to gelatinize. The 6% starch solution was then allowed to cool until it reached 63° C. and the potatoes were added (15% by weight). The potatoes were half inch diced cubes purchased from Redi-Cut foods. The potatoes were allowed to equilibrate for 20 minutes in the starch solution, a constant mixing of the solution was obtained using a horizontal blend tank.

FIG. 4 shows the process flow schematic. A double lobe Waukesha pump was used to pump the product into the process system. The process system consisted of a pre-heating Contherm, final-heating Contherm, a four minute hold tube, a pre-cooling Contherm, and a tubular final cooler. The product was processed at 138° C. Samples of the starch solution were taken before adding potatoes, after adding potatoes, and from the end of the system. Potato damage during processing was evaluated by visual examination. Each simulated particle was collected at the end of the run and identified by its number, all particles were collected in the order they entered. The residence time of 371 articles were recorded in the final heater, the holding tube and the precooler. The average, the maximum and the minimum time are listed in Table One.

TABLE ONE

|  | Final Heater (Time) s | Holding Tube (Time) s | Precooler (Time) s |
| --- | --- | --- | --- |
| Average | 95.25 | 242.439 | 74.152 |
| Maximum | 164.1 | 283.8 | 133.4 |
| Minimum | 52.51 | 227.5 | 49 |
| Std. Deviation | 16.53 | 6.653 | 6.679 |

EXAMPLE TWO

Table Two describes an alternative composition for the article which may be used to measure the residence time of a food particulate, particularly a diced potato in a soup. The chicken alginate article may also be inoculated with bacterial spores for microbiological validation of the aseptic process. A sufficient amount of spores, approximately $10^6$ are added to the chicken alginate composition. A preferred spore is the Puterifactive Anaerobe PA3679. After the aseptic processing, the inoculated articles are incubated and then cultivated for 30 days at which time a positive (no growth) or negative (growth) result may be provided thereby determining the efficacy of the temperature. In order to ensure the lethality of the residence time and temperature, the process is operated at four different temperatures. The first temperature is the presumed processing temperature. Once that temperature is calculated, the process is operated at a higher temperature which should have complete lethality. Next, the process is operated at two lower temperatures which should have growth of the spores after cultivation. The lower temperatures ensure that the spores were not defective thereby invalidating the results for the first temperature. In this manner, the process (and thus the residence time) may have microbiological validation.

TABLE TWO

| Ingredient | Mass (grams) | Percentage |
| --- | --- | --- |
| Strained Gerber's chicken | 400 | 87.051 |
| Distilled Water | 36 | 7.835 |
| Alginic Acid | 20 | 4.353 |
| Microglass Bubbles | 1.6 | 0.348 |
| Calcium Sulfate | 1.2 | 0.261 |
| Sodium Benzoate | 0.4 | 0.087 |
| Tri-Sodium Citrate | 0.3 | 0.065 |

EXAMPLE THREE

Example three is directed to the particle preparation and more specifically the thermal treatment for stabilizing the density of the article so that it corresponds to the changes of the density of the food particle for which it is an analog. Table three below sets forth a preferred embodiment of the article. Table four sets forth the densities of a potatoe, an article composed of the formula of table three, and a synthetic article composed of epoxy and microglass bubbles.

In preparation of the article, 19.2 grams of calcium sulfate(dihydrate) and 4.8 grams of trisodium citrate (dihydrate) were dissolved by agitation in 576 grams of distilled water contained in a five gallon container. 6400 grams of strained chicken baby food was mixed in the solution using a hand mixer. 120 grams of microglass bubbles were blended in using the hand mixer. The spore suspension was then added. 320 grams of high viscosity alginic acid (sodium salt) was slowly added to the mixture. Initially the hand mixer was used and then the remaining alginic acid was kneaded into the dough-like mixture. Portions of the chicken alginate were flattened into a ten inch by six inch by one half inch slab. A grid of half inch cubical interspaces was then pressed on to the slab. The tops were smoothed over ensuring that the interspaces were completely filled with the chicken alginate. The grids containing approximately 2540 cubes were immersed in a 2% calcium chloride solution and refrigerated for twenty hours. The cubes were then removed from the grids, placed in a five galon container containing 2% calcium chloride solution and refrigerated for another twenty hours. Prior to aseptic processing, the chicken alginate cubes were boiled in distilled water for ten minutes.

TABLE THREE

| Ingredient | Mass (grams) | Percentage |
|---|---|---|
| Strained Gerber's chicken | 6400 | 86.02 |
| Distilled Water | 576 | 7.74 |
| Alginic Acid | 320 | 4.30 |
| Microglass Bubbles | 120 | 1.62 |
| Calcium Sulfate | 19.2 | 0.26 |
| Tri-Sodium Citrate | 4.8 | 0.06 |

TABLE FOUR

| ITEM | AVG. DENSITY PRIOR TO TREATMENT | SAMPLE SIZE | TIME | STD. DEV. | AVG. DENSITY AFTER TREATMENT |
|---|---|---|---|---|---|
| Potato | 1.09 | 29 | 864.59 | 42.18 | 1.10 |
| Art. 1 | 1.03 | 115 | 840.21 | 24.03 | 1.06 |
| Art. 2 | 1.04 | 40 | 841.25 | 38.94 | 1.06 |

Art. 1 is a chicken alginate analog according to the formula of table three. Art. 2 is a synthetic analog composed of epoxy and microglass bubbles. The average density prior to treatment is in grams per centimeter cube and was recorded prior to aspetic processing. The average density after treatment is also in grams per centimeter cubes and was recorded subsequent to aseptic processing. The time is the average residence time and is in seconds. As is apparent, the thermal treatment allows the article to change in density as the food particle changes in density during aseptic processing. In this manner, the analog, or article, may more closely mimic the food particle during aseptic processing.

Figure 5:
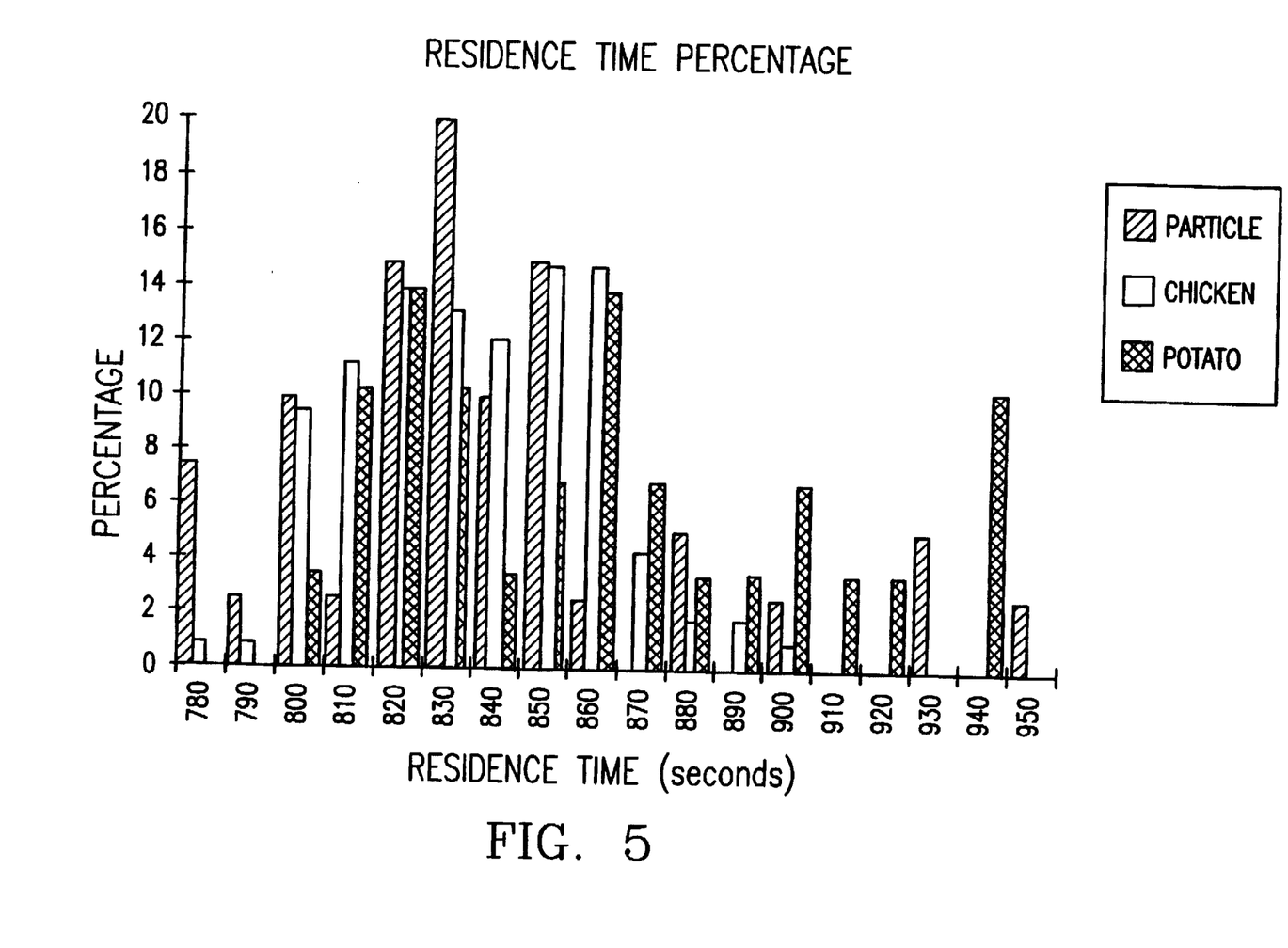

As is also apparent from table four, the analogs have a much shorter average residence time than the potato. This shorter residence time for the analogs is intentional. For it is the faster particle which undergoes the least amount of aeptic processing. Tracking the fastest particle allows the aseptic processing to be adjusted to completely treat all of the particles. The residence time percentages are also shown in FIG. 5.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. An article for determining the residence time of a food particle undergoing aseptic processing wherein the food particle is a constituent of a heterogeneous fluid, the heterogeneous fluid composed of at least the food particle and a fluid, the article comprising:

a magnet; and an analog of the food particle encompassing the magnet, the analog having substantially the shape, size and rotational inertia of the food particle with the magnet encompassed therein, and the article having an approximate density within a range between the density of the fluid and the density of the food particle.

2. The article according to claim 1 wherein the food particle is selected from the group consisting of fruit, meat, fish, pasta, vegetable and bread.

3. The article according to claim 1 wherein the density of the article is set by thermal treatment.

4. The article according to claim 1 wherein the analog comprises a chicken alginate component and a plurality of microglass bubbles.

5. The article according to claim 4 wherein the article is inoculated with a bacterial spore.

6. The article according to claim 1 wherein the heterogeneous food is selected from the group consisting of soup, pudding and yogurt.

7. The article according to claim 1 further comprising at least one additional magnet.

8. The article according to claim 1 wherein the analog has substantially the thermal conductivity of the food particle.

9. A process for determining the residence time of a food particle undergoing aseptic processing wherein the food particle is a constituent of a heterogeneous fluid, the heterogeneous fluid composed of at least the food particle and a fluid, the process comprising the steps of:

substituting an article for the food particle undergoing aseptic processing, the article comprising a magnet capable of generating a magnetic field through a tubing composed of stainless steel and an analog, the article having an approximate density within a range between the density of the fluid and the density of the food particle;

subjecting the article to aseptic processing, the aseptic processing performed on an apparatus comprising a heater for increasing the temperature of the heterogeneous fluid, a holding tube for maintaining the heated heterogeneous fluid at a predetermined temperature for a predetermined residence time, and a series of tubing for flow communication between the heater and the holding tube;

receiving a first signal indicative of the article entering the holding tube, the first signal generated from a change in voltage of a first plurality of electrically conductive coils disposed on the exterior of the stainless steel tubing prior to the entrance of the holding tube, the change in voltage generated by the article passing through the first plurality of electrically conductive coils therein inducing an emf in the first plurality of electrically conductive coils; and receiving a second signal indicative of the article exiting the holding tube, the second signal generated from a change in voltage of a second plurality of electrically conductive coils disposed on the exterior of the stainless steel tubing subsequent to the exit of the holding tube, the change in voltage generated by the article passing through the second plurality of electrically conductive coils therein inducing an emf in the second plurality of electrically conductive coils.

10. The process according to claim 9 further comprising the step of:

calculating the residence time of the article by measuring the time between the first signal and the second signal.

11. The process according to claim 9 further comprising the step of:

receiving a multiple of additional signals generated by the article throughout the aseptic processing of the food particle.

12. The process according to claim 9 further comprising the step of:

transmitting the signals to a data acquisition system for computational processing.

13. The process according to claim 9 further comprising the step of subjecting the article to thermal treatment to stabilize the density of the article as the article undergoes aseptic processing.

14. The process according to claim 9 wherein the article comprises chicken alginate.

15. A process for determining the residence time of a food particle undergoing aseptic processing wherein the food particle is a constituent of a heterogeneous fluid, the heterogeneous fluid composed of at least the food particle and a fluid, the process comprising the steps of:

substituting an article for the food particle undergoing aseptic processing, the article comprising a magnet capable of generating a magnetic field through a tubing composed of stainless steel and an analog, the article having an approximate density within a range between the density of the fluid and the density of the food particle;

receiving a first signal indicative of the article entering a holding tube, the first signal generated from a change in voltage of a first plurality of electrically conductive coils disposed on the exterior of the stainless steel tubing prior to the entrance of the holding tube, the change in voltage generated by the article passing through the first plurality of electrically conductive coils therein inducing an emf in the first plurality of electrically conductive coils; and receiving a second signal indicative of the article exiting the holding tube, the second signal generated from a change in voltage of a second plurality of electrically conductive coils disposed on the exterior of the stainless steel tubing subsequent to the exit of the holding tube, the change in voltage generated by the article passing through the second plurality of electrically conductive coils therein inducing an emf in the second plurality of electrically conductive coils.

\* \* \* \* \*